UNITED STATES PATENT OFFICE.

JOHN GEORGE JARVIS, OF ADAMS, MASSACHUSETTS, ASSIGNOR TO THE AMERICAN ZYLONITE COMPANY, OF SAME PLACE.

MANUFACTURE OF PYROXYLINE COMPOUNDS.

SPECIFICATION forming part of Letters Patent No. 329,313, dated October 27, 1885.

Application filed July 22, 1885. Serial No. 172,323. (Specimens.)

*To all whom it may concern:*

Be it known that I, JOHN G. JARVIS, a citizen of the United States, residing at Adams, in the county of Berkshire and State of Massachusetts, have invented new and useful Improvements in the Manufacture of Pyroxyline Compounds, of which the following is a specification.

In the manufacture of pyroxyline compounds for use in the arts various solvents have been employed for converting dry soluble pyroxyline into a plastic mass—such, for instance, as gum-camphor, with or without alcohol, wood-spirits, or ethers, to assist the combination.

The object of my invention is to provide a new and improved solvent for converting dry soluble pyroxyline into such condition that it can be successfully and efficiently molded or worked into compounds useful in the arts.

In carrying out my invention I use any or all of the following gum-resins—to wit, gum-dammar, gum-guaiacum, and gum-mastic. I have found that such gums, under heat and pressure and suitable manipulation, can be united with soluble pyroxyline, so as to render the same capable of being molded or worked into pyroxyline compounds for use in the arts without employing any auxiliary solvent. I preferably reduce to a fine powder either of the above-mentioned gum-resins; but, if desired, mixtures of the said gum-resins may be used. I grind the pyroxyline, by any suitable means, into small flakes in the presence of water, and subsequently thoroughly dry the same prior to mixing with the powdered gum resin or resins. If preferred, however, the latter may be added to the pyroxyline flakes while they are in a wet or in a semi-damp condition, and then subsequently dried.

I prefer a mixture in the following proportions, namely: to one hundred (100) parts of the pyroxyline, forty (40) parts of the gum-resin, which is selected, or a mixture of the gum-resins above specified with fifty (50) parts of alcohol, either wood or grain, to assist in effecting their combination or union.

I do not confine myself to the exact proportions specified, as they may be changed or varied without altering the character of my invention, and when I desire to produce a less brittle compound the addition of from ten (10) to fifty (50) parts, or thereabout, of castor or other fixed oil will effect such result.

Various gums have heretofore been proposed for the purpose of hardening compounds of pyroxyline, camphor, and liquid solvents; but so far as I am aware no natural gum-resin of the class specified by me has been employed solely as a solvent of dry soluble pyroxyline. I have by a series of experiments discovered that the specific gum-resins before mentioned can be successfully and advantageously used as solvents for pyroxyline, so as to render it a perfect homogeneous mass, capable of being molded or worked into any form desired. The same may be colored by the use of pigments or other coloring-matter. Fixed or volatile oils may be used in combination with any one or all of the three gums. The pyroxyline pigments are oxide of zinc, chrome-yellow, &c.; fixed oils—castor, cotton-seed, &c.; volatile oils—oil of lavender, oil of cloves, &c.; other coloring-matter, aniline dyes.

Having thus described my invention, what I claim is—

1. The combination of gum-dammar with pyroxyline, with or without pigments or other coloring-matter, fixed or volatile oils, substantially as described.

2. The combination of gum-guaiacum with pyroxyline, with or without pigments or other coloring-matter, fixed or volatile oils, substantially as described.

3. The combination of gum-mastic with pyroxyline, with or without pigments or other coloring-matter, fixed or volatile oils, substantially as described.

4. The combination of a mixture of two or more of the following gums—viz: gum-dammar, gum-guaiacum, and gum-mastic—with pyroxyline, with or without pigments or other coloring-matter, fixed or volatile oils, substantially as described.

In testimony whereof I affix my signature in presence of two witnesses.

J. GEO. JARVIS.

Witnesses:
ARTHUR A. HALL,
W. N. BIXBY.